United States Patent Office 2,699,453
Patented Jan. 11, 1955

2,699,453

PROCESS FOR THE PRODUCTION OF DIETHYLKETONE

Ernest A. Naragon, Glenham, and Alfred J. Millendorf and Joseph H. Vergilio, Beacon, N. Y., assignors to The Texas Company, New York, N. Y., a corporation of Delaware No Drawing. Application January 31, 1950, Serial No. 141,603

7 Claims. (Cl. 260—597)

The present invention relates to a process for the production of diethylketone. More particularly, the invention discloses a process for directing the reaction between ethylene, carbon monoxide and hydrogen so as to form primarily diethylketone.

The reaction of olefins with carbon monoxide and hydrogen to form a product comprising a mixture of aldehydes and ketones is disclosed in the Roelen patent, U. S. 2,327,066. Therein it is revealed that at moderately elevated temperatures of about 120 to 395° F. (50 to 200° C.) and at a pressure of at least 300 pounds per square inch (20 atmospheres) and preferably of at least 750 pounds per square inch (50 atmospheres), an olefin reacts with carbon monoxide and hydrogen in the presence of a hydrogenation catalyst to form a mixture of carbonyl compounds comprising aldehydes and ketones. Roelen's process is characterized by the production of aldehydes and ketones in indiscriminate quantities; the patent does not disclose any method or conditions whereby the reaction between an olefin and a mixture of carbon monoxide and hydrogen can be regulated so that the liquid reaction product is predominantly either aldehydic or ketonic in nature. However, the examples presented in the Roelen patent indicate that the aldehydes predominate in the liquid product obtained by the reaction of an olefin with a mixture of carbon monoxide and hydrogen; the described reaction between ethylene, carbon monoxide and hydrogen yields a product comprising 40% propionaldehyde and 20% diethylketone.

We have discovered that it is possible by discriminate choice of reaction conditions to control the reaction between ethylene, carbon monoxide and hydrogen so that the liquid product obtained as a result of the reaction between these components contains better than 50% diethylketone. In accordance with our discovery, diethylketone is the predominate product of reaction when ethylene, carbon monoxide and hydrogen are reacted substantially in the gas phase at a mol ratio of ethylene to carbon monoxide of at least 1.5 and a mol ratio of ethylene to hydrogen of at least 0.67. The reaction between ethylene, carbon monoxide and hydrogen to produce mainly diethylketone is effected at a pressure above about 100 pounds per square inch, for example, up to about 1400 pounds and at a temperature below 300° F., and in the presence of a catalyst containing a metal of the iron group. It is necessary to maintain substantially gas phase conditions and the aforedescribed mol ratios, temperature and pressure conditions in order to obtain diethylketone as the major product of reaction.

Our invention, therefore, comprises the discovery of means whereby the reaction between ethylene and a mixture of carbon monoxide and hydrogen can be controlled so as to produce diethylketone to the almost practical exclusion of the production of propionaldehyde. It is possible to so canalize the reaction that less than 5% of the liquid product comprises propionaldehyde. As a result of this invention, there is made available a commercial source of diethylketone whose chemical and physical properties peculiarly adapt it to extensive use as a solvent in petroleum refining, plastic manufacture, etc.

In order to direct the reaction of ethylene, carbon monoxide and hydrogen towards the production of mainly diethylketone, it is necessary to observe three requirements: a critical molecular ratio of reactants must be maintained; critical temperature and pressure conditions must be employed; substantially gas phase operation must be maintained.

The mol ratio of ethylene to carbon monoxide must be maintained higher than 1.5 in order to insure that the liquid product contains more than 50 weight per cent diethylketone; the mol ratio of ethylene to hydrogen should be greater than 0.67, or to express this latter relationship in a different manner, the hydrogen content of the reaction mixture should be less than one and one-half the ethylene content on a mol basis. Employing preferred mol ratios of the reactants, for example, a mixture containing an approximate ratio of ethylene to carbon monoxide to hydrogen of about 3/1/1, it is possible to obtain a liquid product comprising 80 per cent diethylketone and only 2 per cent propionaldehyde.

Optimum conversion of reactants to diethylketone is obtained when the reaction mixture has a composition of about 2 to 4 mols of ethylene per mol of carbon monoxide and 1 to 4 mols of ethylene per mol of hydrogen. The yield of liquid product per cubic meter of charge gas is not the sole criterion of the effectiveness of the process, because an excess of one of the reactants over the stoichiometric quantity causes this yield to be low. An excellent method of evaluating the effectiveness of conversion of the reactants to diethylketone is based on the amount of ideal feed mixture charged that is converted to diethylketone (the ideal mixture being one in which the reactants are present in stoichiometric quantities, namely, 2 mols ethylene, one mol carbon monoxide and one mol hydrogen). The yield on this basis may be designated as the theoretical conversion based on the ideal 2/1/1 mixture charged; it is obtained in terms of weight per cent by dividing the weight of ketone recovered times 100 by the weight of the ideal 2/1/1 mixture charged. Hereafter, for the sake of convenience, the mol ratio of reactants will always be represented in this fashion, e. g., 2/1/1 with the mols of ethylene, the mols of carbon monoxide and the mols of hydrogen being represented by the first, second and third integers, respectively. It is on the basis of the theoretical conversion of ideal 2/1/1 mixture charged that reaction mixtures containing a mol ratio of ethylene to carbon monoxide between 2 and 4 and a mol ratio of ethylene to hydrogen between 1 and 4 have been found to give optimum results. In the examples that follow, the yields will be expressed not only in terms of theoretical conversion on the basis of the maximum 2/1/1 mixture charged, but also on the basis of the weight per cent diethylketone in the liquid product.

In order to convert a reaction mixture containing the prescribed mol ratio of reactants, it is necessary to maintain a pressure of at least 100 pounds per square inch in the reaction zone. A reaction mixture of the prescribed composition is converted mainly into diethylketone at pressures from 100 to 1400 pounds per square inch; the pressure, however, is preferably maintained between 200 and 1000 pounds per square inch in order to maintain substantially gas phase conditions and keep the yield of diethylketone at a maximum. In the absence of a diluent, such as methane, ethane, propane and nitrogen, it has been found that optimum results are obtained at about 300 to 700 pounds per square inch; in the presence of a gaseous diluent, higher operating pressures, for example, 500 to 1400 pounds per square inch are recommended.

The temperature limitations on the conversion of ethylene, carbon monoxide and hydrogen of the prescribed composition to diethylketone are more stringent than are the pressure requirements. The reaction occurs within a fairly limited range of about 100 to 300° F. Below 100° F. there is substantially no conversion of the reaction mixture to diethylketone even at elevated pressures of about 1400 pounds per square inch. Over about 300° F. the reaction mixture is converted mainly to water and hydrocarbons with only negligible formation of diethylketone; moreover, the catalyst activity deteriorates rapidly at high temperatures of about 275° F. and up. Temperatures of about 125 to 250° F. are preferred for conversion of the prescribed reaction mixture to diethylketone. In fixed bed operation, the temperature is advantageously maintained at about 150° F. to 200° F.

The maintenance of gas phase conditions is critical in order to direct the reaction to the production of mainly diethylketone. Moreover, when the reaction is effected in the presence of a liquid carrier, that is, in substantially liquid phase operation, propionaldehyde predominates in the liquid product. The criticalness of maintaining gas phase conditions to produce mainly ketones is one of the novel and unexpected features of this invention.

In order to maintain substantially vapor phase conditions, it is advisable to continuously remove liquid product from the reaction zone substantially as it forms. Diethylketone is substantially in the liquid phase under the prescribed temperature and pressure conditions, and its accumulation in the reaction zone tends to prevent the maintenance of gas phase conditions. Accordingly, the best results are obtained when liquid product is removed substantially as formed. Downflow operation lends itself to continuous removal of reaction product.

The reaction between ethylene, carbon monoxide and hydrogen to form diethylketone is effected in the presence of a catalyst containing a metal of the iron group as the active constituent thereof. A cobalt catalyst is preferred for the conversion of ethylene, carbon monoxide and hydrogen to diethylketone, but other catalysts in which iron or nickel is the active hydrogenating constituent can be used to effect the conversion. Moreover, catalysts containing more than one component of the iron group, for example, an iron-cobalt catalyst, may be used to effect the conversion of ethylene, carbon monoxide and hydrogen to diethylketone. Supported, unsupported, fused and precipitated catalysts, in which the major active component is a metal of the iron group, all may be used in the process of this invention.

As heretofore mentioned, cobalt is preferred for this reaction; a precipitated cobalt catalyst in which the cobalt is supported on an adsorptive material, such as uncalcined diatomaceous earth, silica-stabilized alumina, etc., and which is promoted with minor quantities of oxides of metals, such as magnesium, thorium, vanadium, manganese, calcium, etc., is particularly active in the conversion of ethylene, carbon monoxide and hydrogen to diethylketone. In the examples which will be hereafter presented to illustrate the method of the invention, a supported cobalt catalyst is used, since we have found that excellent conversions are obtained therewith.

The production of diethylketone from a gaseous mixture of ethylene, carbon monoxide and hydrogen can be effected in accordance with any of the usual techniques for vapor phase catalytic conversion. Thus, fixed catalyst beds may be used wherein the reactants in vapor phase are passed through a stationary bed of catalyst; the fixed catalyst beds may be arranged in series so that they may be used alternately in reaction and regeneration cycles. Fluid catalyst operation, wherein the catalyst is subjected to continuous reactivation and recycle, may also be employed; the various modifications of fluid type operation, such as fluidized fixed bed, moving bed, etc., are other feasible modes of operation; the fluidization of the catalyst may also be effected by mechanical means.

Of course, it will be understood that some of the operating variables, such as space velocity, will vary considerably with the type of conversion that is employed. In the ensuing discussion and examples, the optimum conditions for fixed bed operation will be presented.

We have found that in fixed bed operation with a supported cobalt catalyst, a space velocity of 50 to 150 may be employed with optimum results being obtained at a space velocity of about 100; space velocity is herein defined as volume of gaseous reactants per volume of catalyst per hour. A space velocity of 100 is preferred because its use results in a high liquid yield with a high ketone content at a satisfactory throughput of charge gas.

The ethylene employed in the reaction may be of high purity, for example, 95 per cent or better, or may be a mixture of ethylene and other light hydrocarbon gases, such as propane, methane, ethane, which mixture is readily obtainable as a refinery by-product of catalytic cracking operations or other refinery operations. The reaction may also be effected in the presence of inert diluents, such as nitrogen. The fact that the process of the invention is operable employing a dilute mixture of ethylene, provided the critical molecular relationships and operating conditions heretofore specified are employed, is of great importance from a commercial view-point, since ethylene mixtures are readily available as refinery by-products, whereas ethylene of 95 per cent or higher purity is only available as a result of separation procedures which have a marked effect upon the price of the raw material.

A mixture of carbon monoxide and hydrogen to be used in the reaction can be obtained from various sources, such as the oxidation of methane with air of oxygen, the water-gas reaction, methane and steam reaction and methane-carbon dioxide reaction. It is also possible to prepare a mixture of hydrogen and carbon monoxide by burning a hydrogen-deficient crude, such as Santa Maria crude, with oxygen or by burning a mixture of methane and Santa Maria crude with oxygen.

In the following examples, the process of this invention is illustrated:

EXAMPLE I

Ethylene, carbon monoxide and hydrogen in a mol ratio of 2.4/1.0/1.1 were introduced at a space velocity of about 93 volumes of reactant mixture per volume of catalyst per hour into a reaction zone containing a supported cobalt catalyst comprising approximately 32 per cent cobalt, 64 per cent uncalcined diatomaceous earth, 3 per cent magnesia and 1 per cent thoria. The catalyst which had been reduced at 660° F. was contained within the reaction zone in the form of a fixed bed of dense particles of approximately 10–20 mesh. The reaction zone was maintained at 150° F. by indirect heat exchange; the pressure maintained within the reaction zone was about 300 pounds per square inch. There issued from the reaction zone a product mixture from which was obtained 635 grams of liquid product per cubic meter of charge gas which amounts to a 66 per cent conversion of total gaseous reactants to liquid. The liquid product contained 78 per cent diethylketone and 3 weight per cent propionaldehyde. Theoretical conversion to diethylketone on the basis of the 2/1/1 mixture of ethylene, CO and $H_2$ charged amounted to 57 per cent.

EXAMPLE II

Ethylene, CO and $H_2$ in a mol ratio of 2.3/1.0/1.2 were introduced at a space velocity of 100 into a fixed bed reaction zone containing a supported cobalt catalyst of the composition specified in Example I. The reaction zone was maintained at 150° F. and 700 pounds per square inch. There issued from the reaction zone a product mixture from which was obtained 837 grams of liquid product per cubic meter of charge gas which amounts to a 90 per cent conversion of total gaseous reactants to liquid. The liquid product contained 61 weight per cent diethylketone and 6 weight per cent propionaldehyde. The theoretical conversion to diethylketone on the basis of the 2/1/1 mixture of ethylene, CO and $H_2$ charged amounted to 59 per cent.

The effect of employing a liquid carrier is illustrated in Example III wherein the reaction was carried out in the medium of toluene. It will be noticed that propionaldehyde is the predominant product of reaction even though a mole ratio of 2/1/1 ethylene/CO/$H_2$ and temperature conditions similar to Examples I and II were employed.

EXAMPLE III

Ethylene, carbon monoxide and hydrogen in a mol ratio of 2/1/1 together with toluene were continuously charged to a two gallon stirred autoclave. Excess catalyst of the composition specified in Example I was present in the autoclave in the form of a toluene-catalyst slurry at the start of the run. The reaction zone was maintained at a temperature of about 200° F. and 2200 pounds per square inch. An effluent comprising toluene-catalyst slurry, product of conversion and unconverted reactants, was removed continuously throughout the run as it was displaced by the charge materials. At the end of five hours, the overall product comprising overhead and reactor contents on a toluene-free basis analyzed 46 weight per cent propionaldehyde, 11 weight per cent diethylketone and a residue of 43 weight per cent. The product removed during the reaction run is designated overhead product and the product left in the reactor is labeled reactor contents; overhead product analyzed 49 weight per cent propionaldehyde, 8 weight per cent diethylketone and 43 weight per cent residue; the reactor contents analyzed 43 weight per cent propionaldehyde, 13 weight per cent diethylketone and 44 weight per cent residue.

In Table I below, the effect of varying molecular ratios of reactants is summarized in tabular form.

Table I

| Mol Ratio | Liquid Yield in Grams per Cu. Meter | Percent Diethyl-ketone in Liquid Product | Percent Propion-aldehyde in Liquid Product | Theo. Conv. on Basis of 2/1/1 Mixture Charged. Wt. of ketone recovered×100 / Wt. of 2/1/1 Mixture Charged |
|---|---|---|---|---|
| 1.0/1.0/1.0 | 430 | 24 | 16 | 16 |
| 1.5/1.0/1.0 | 555 | 53 | 5 | 35 |
| 2.4/1.0/1.1 | 635 | 78 | 3 | 57 |
| 3.8/1.0/1.0 | 460 | 80 | 2 | 57 |
| 5.7/1.0/0.9 | 267 | 85 | 2 | 48 |
| 1.0/1.0/1.9 | 495 | 20 | 22 | 19 |
| 1.8/1.0/1.8 | 646 | 42 | 11 | 33 |
| 2.9/1.0/2.1 | 524 | 62 | 9 | 50 |

In the experiments which are summarized in tabular form in Table I, all of the operating conditions with the exception of molecular ratio of reactants are maintained constant. The conditions under which this group of experiments were performed are summarized as follows:

Catalyst: Supported cobalt catalyst comprising approximately 32 per cent cobalt, 64 per cent uncalcined diatomaceous earth, 3 per cent magnesia and 1 per cent thoria; this catalyst was reduced at 660° F.
Temperature: 150° F.
Pressure: 300 pounds per square inch.
Space velocity: 100 volumes of reactant mixture per volume of catalyst per hour.
Type of conversion: Fixed bed.

In the table, the yields obtained with the varying molecular ratios of reactants are expressed on three bases, viz., in terms of liquid yield in grams per cubic meter, in terms of per cent diethylketone in the liquid product and also in terms of theoretical conversion on the basis of 2/1/1 mixture charged. The effect of varying the molecular ratio of reactants is more strikingly shown in the yield based on per cent diethylketone in the product and in the theoretical conversion on the basis of 2/1/1 mixture charged. It is from these two figures that the critical nature of the molecular ratio of reactants heretofore described is determined.

The liquid yield in grams per cubic meter, as has been heretofore pointed out, is not as reliable a criterion as the aforementioned two methods of evaluating the effectiveness of the process because the employment of an excess of one of the reactants will lower the yield on this basis; an excess of one of the reactants which remains substantially unchanged during conversion can be readily recycled to the ketone-forming reaction.

From Table I, it is apparent why optimum results in ketone production are said to occur when the molecular ratio of ethylene to carbon monoxide falls between 2 and 4 and the molecular ratio of ethylene to hydrogen is in the range of 1 to 4.

It will be understood, of course, that the preceding examples are merely illustrative of the invention and that other catalysts may be employed. Further, other temperatures and pressures which fall within the limits specified may also be used to effect conversion of a mixture of ethylene, carbon monoxide and hydrogen to diethylketone. Since the conversion of ethylene, carbon monoxide and hydrogen to diethylketone is an exothermic reaction, it readily lends itself to fluid type operation and is not limited to fixed bed type of process as is described in the foregoing examples.

This application is a continuation-in-part of Serial Number 773,938, filed September 13, 1947, now abandoned.

Obviously, many modifications and variations of the invention as hereinbefore set forth may be made without departing from the spirit and scope thereof and, therefore, only such limitations should be imposed as are indicated in the appended claims.

We claim:
1. A continuous process for controlling the reaction of ethylene, carbon monoxide and hydrogen to yield a liquid product comprising better than about 50 per cent diethylketone and a small amount of propionaldehyde which comprises continuously introducing ethylene, carbon monoxide and hydrogen into a reaction zone containing a catalyst comprising a metal of the iron group, employing reactants in such proportions that the mol ratio of ethylene to carbon monoxide is between 1.5 and 5.7 and the mol ratio of ethylene to hydrogen is between 0.67 and 6, effecting the reaction under gas phase conditions, maintaining a pressure between about 100 pounds and 1400 pounds per square inch, and a temperature between 100° and 300° F. in said reaction zone, continuously removing liquid product from said reaction zone and recovering diethylketone from said liquid product.

2. A process according to claim 1 in which the reaction is effected at a pressure between 200 and 1000 pounds per square inch.

3. A continuous process for controlling the reaction of ethylene, carbon monoxide and hydrogen to yield a liquid product comprising better than about 50 per cent diethylketone and a small amount of propionaldehyde which comprises continuously introducing ethylene, carbon monoxide and hydrogen into a reaction zone containing a catalyst comprising a metal of the iron group, employing the reactants in such proportions that the mol ratio of ethylene to carbon monoxide is between 2 and 4 and the mol ratio of ethylene to hydrogen is between 1 and 4, effecting the reaction under gas phase conditions in the absence of a liquid carrier, maintaining a pressure between 100 pounds and 1400 pounds per square inch and a temperature between 100° and 300° F. in said reaction zone, removing liquid product substantially as formed from said reaction zone and recovering diethylketone from said liquid product.

4. A process according to claim 3 in which a cobalt catalyst is employed.

5. A process according to claim 3 in which the diethylketone-forming reaction is effected at a pressure between 200 and 700 pounds per square inch.

6. A process according to claim 3 in which there is employed a cobalt catalyst which has been reduced at a temperature of about 660° F.

7. A continuous process for controlling the reaction of ethylene, carbon monoxide and hydrogen to yield a liquid product comprising better than about 50 per cent diethylketone and a small amount of propionaldehyde, which comprises continuously introducing ethylene, carbon monoxide and hydrogen to a reaction zone containing a cobalt catalyst, employing the reactants in such proportions that the mol ratio of ethylene to carbon monoxide is between 2 and 4 and the mol ratio of ethylene to hydrogen is between 1 and 4, effecting the reaction under gas phase conditions, at a pressure between 200 and 1,000 pounds per square inch and at a temperature between 100° and 300° F., removing liquid product substantially as formed from said reaction zone and recovering diethylketone from said liquid product.

References Cited in the file of this patent

UNITED STATES PATENTS

| 2,327,066 | Roelen | Aug. 17, 1943 |
| 2,437,600 | Gresham et al. | Mar. 9, 1948 |
| 2,473,995 | Gresham et al. | June 21, 1949 |
| 2,497,303 | Gresham et al. | Feb. 14, 1950 |
| 2,549,454 | Gresham et al. | Apr. 17, 1951 |

OTHER REFERENCES

"National Petroleum News," vol. 37, No. 45, pages R–922 to R–930, Nov. 7, 1945.

Bios Final Report 447 (PB–77705), "Interrogation of Dr. Otto Roelen," pp. 45 (1947), Hobalt Publishing Co., p. 47.